United States Patent Office 3,353,651
Patented Nov. 21, 1967

3,353,651
ARTICLE ACCUMULATOR
Clinton Clark Witmer, Modesto, Calif., assignor to Tri-Valley Growers, San Francisco, Calif., a corporation of California
Original application July 18, 1963, Ser. No. 296,046, now Patent No. 3,300,065, dated Jan. 24, 1967. Divided and this application Oct. 31, 1966, Ser. No. 590,737
8 Claims. (Cl. 198—32)

ABSTRACT OF THE DISCLOSURE

A method and means for accumulating article fed onto a conveyor in excess of the number of articles fed therefrom including an air platform adjacent the conveyor having a top plate inclined downwardly toward the conveyor. When generally cylindrical-shaped articles are fed onto the conveyor at a faster rate than they are removed therefrom, the objects are squeezed off the conveyor and onto the inclined air platform. When space again becomes available on the conveyor, the articles on the inclined air platform slide under the force of gravity back onto the conveyor.

---

This is a divisional applicational of patent application Ser. No. 296,046, filed July 18, 1963, entitled, "Means for Material Handling," by Clinton Clark Witmer and assigned to the same assignee as the present invention, now Patent No. 3,300,065 issued Jan. 24, 1967.

This invention relates to a method and means for handling articles, and more particularly to an accumulator of the air cushion type for accumulating excess objects along a conveyor.

Accumulators are well known and often are employed in conjunction with conveyors for storing or accumulating articles which are fed onto the conveyor in excess of the number of articles fed therefrom. A typical prior art conveyor simply comprises a rotating device onto which the excess articles are fed and from which they are fed when there is available space on the conveyor. Such prior art accumulators include moving parts which are subject to wear and malfunction.

An object of this invention is the provision of an accumulator for items conveyed between operating stations, which accumulator includes a stationary platform with no moving parts upon which items may be accumulated.

An object of this invention is the provision of an improved method of accumulating articles such as cans which results in a minimum denting of the cans.

An object of this invention is the provision of an accumulator for use with a conveyor of items of a generally cylindrical shape, which items are moved onto the accumulator only by wedging interaction of the abutting items on the conveyor, the items returning to the conveyor from the accumulator when there is sufficient room between items on the conveyor.

In accordance with this invention, an inclined air platform may be located adjacent a conveyor for use as an accumulator. In this use, the air platform is inclined slightly toward the conveyor and items may be accumulated thereon by the squeezing action between such items on the conveyor when more items are fed to the conveyor than are removed therefrom. The items are returned to the conveyor by action of gravity when there is space available on the conveyor.

In the drawings, wherein like reference characters refer to the same parts in the several views.

Figure 1:
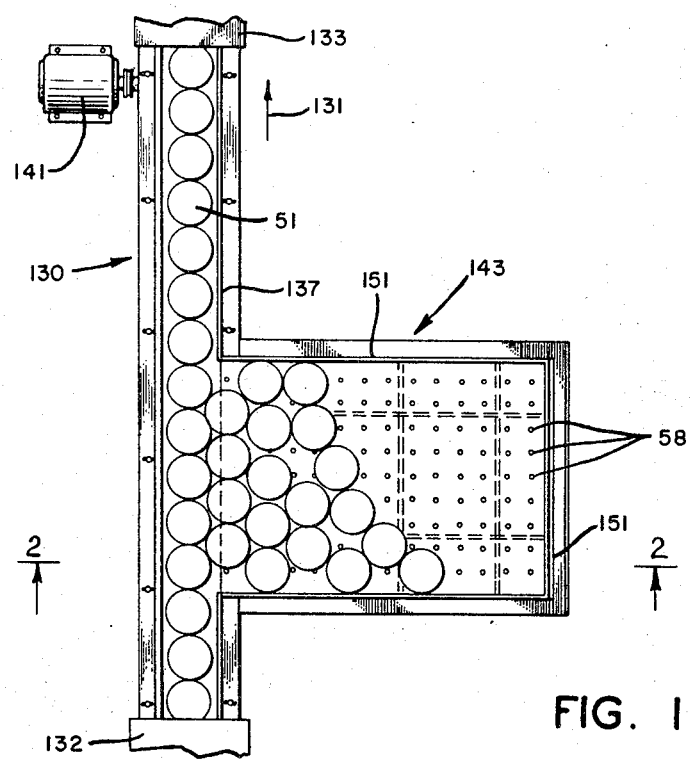
FIGURE 1 is a top plan view of an accumulator embodying this invention.
Figure 2:
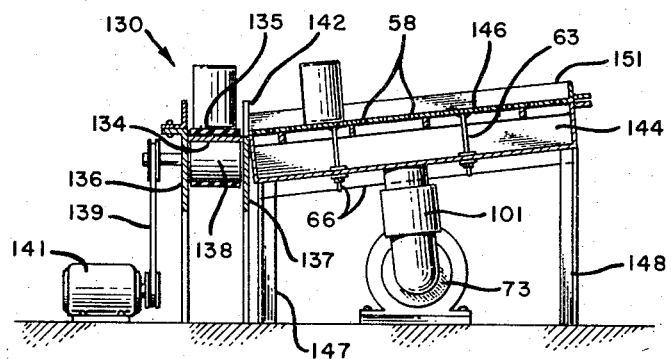
FIGURE 2 is a cross-sectional view taken along line 2—2 of FIGURE 1.

A novel accumulator which employs an inclined air platform is shown in FIGURES 1 and 2 of the drawings, to which reference is now made. A conveyor 130 is provided along which a single row, or line, of cans 51 may travel in the direction of the arrow 131 from a first station 132 at the upstream side thereof to a second station 133 at the downstream side thereof along a generally horizontal straight run. The illustrated conveyor is of the belt type and includes a belt 135 beneath which is positioned a plate 134 for the support thereof. The plate extends between the side walls 136 and 137 of the conveyor, and the side walls extend upwardly above the top of the belt 135 and act as guides for the cans 51 on the belt. The belt is driven by a suitable drive roller 138 connected by a belt 139 to a suitable drive source, such as a motor 141.

In accordance with this invention, the one side wall 137 is provided with a cut-out portion, designated 142, which cut-out portion extends below the level of the upper surface of the belt 135. Directly adjacent the cut-out portion 142 is an inclined air platform, designated 143, comprising the accumulator of this invention. Similarly to the air platforms and conveyor described in my copending application Ser. No. 296,046, the air platform 143 includes a plenum chamber 144 having a cover 146 provided with a plurality of holes 58 therethrough. The chamber is adapted for connection to a source of air comprising the blower 73 through the connection 101. As with the air platform shown in my copending application Ser. No. 296,046 the illustrated platform includes tie-rods 63 and stiffeners 66. The air platform 143 is shown mounted on legs 147 and 148 adjacent the front and rear ends thereof, respectively. The rear legs 148 are longer than the front legs 147 such that the air platform is inclined toward the belt 134. The tilt of the platform is greatly exaggerated in the drawings for purposes of illustration, an incline of 1 to 3 degrees being sufficient in most instances. The edge of the air plate 146 adjacent the belt is at the same level as the belt whereby cans may easily pass from the belt onto the accumulator and back onto the belt from the accumulator. Side rails 151 prevent the cans from falling off the air platform.

In the operation of the accumulator cans are fed from the station 132 to station 133 along the conveyor belt 135, which stations may comprise, for example, filling and capping stations for filling the cans and then capping the same. The system, however, is not limited to such filling and capping operations or even to the use of cans or ferrous objects, since no magnetic lifting means are required. If the capper 133 accepts cans at a fast enough rate as they come off the belt 135, no accumulation of cans is effected. If, however, the filler operation feeds cans onto the belt at a greater rate than the cans can be utilized at the capping machine and removed from the downstream side of the conveyor, the cans will be accumulated on the air platform 143. Under such conditions the cylindrical cans are squeezed outwardly through the cut-out portion 142 of the rail 137 by action of the force of the belt on the cans. As more cans are fed onto the conveyor, the squeezing action continues and results in the side-ward movement of the cans from the conveyor onto the air platform. As the cans accumulate they are pushed up the inclined surface of the platform on the air cushion provided by the air flowing through the holes 58 of the air plate 57. Such accumulation may obviously continue until the air platform is full, at which time accumulation must, of course, cease. As cans are drawn off the end of the conveyor line by the processing station 133, and room become available on the conveyor for the accumulated cans, the cans slide down the inclined air plate 146 and onto the conveyor.

Having now described the invention in detail in accordance with the requirements of the patent statutes various changes and modifications will suggest themselves to those skilled in this art, and it is intended that such changes and modifications shall fall within the spirit and scope of the invention as recited in the following claims.

I claim:
1. An accumulator for objects comprising:
    a conveyor,
    an air platform having an inclined top plate for supporting objects on an air cushion, and
    means for positioning said platform adjacent said conveyor with the top plate inclined downwardly toward the conveyor to permit transfer of objects from the conveyor onto the air platform and back onto the conveyor from the air platform.
2. The apparatus as defined in claim 1 wherein the conveyor comprises a belt for support of the articles along a generally horizontal run, and
    said air platform is positioned adjacent said conveyor belt at said generally horizontal run.
3. The accumulator as defined in claim 1 wherein said conveyor comprises guide rails along opposite sides thereof with an opening formed therein adjacent said platform to provide ingress and egress of said articles onto and from said platform.
4. The accumulator as defined in claim 1 including a side rail at the edge of the platform to prevent objects which are transferred onto the accumulator from the conveyor from falling off therefrom.
5. The accumulator as defined in claim 1 wherein the air platform comprises a plenum chamber closed by said inclined top plate which is formed with a plurality of holes therethrough, means for pressurizing the plenum chamber to provide streams of air from the holes for the support of the objects, the slope of the top plate being sufficiently steep for sliding of the objects downwardly therealong on the air cushion under force of gravity but insufficiently steep for sliding of the objects therealong when the plenum chamber is not pressurized.
6. An accumulator for generally upright cylindrical objects conveyed between stations comprising a conveyor located between said stations along which the objects are conveyed, guide rails at opposite sides of the conveyor, one of said guide rails being formed with a cut-out portion through which objects may pass, a generally flat plate formed with a plurality of apertures therethrough adjacent the cut-out portion in the guide rail and inclined toward the conveyor, a plenum chamber which includes the plate as an upper wall thereof, and means pressurizing the plenum chamber to provide streams of air from the apertures in the plate for air cushion support of objects moved thereon from the conveyor, the objects being squeezed off the conveyor and accumulated on the plate when the objects are fed onto the conveyor at a faster rate than they are discharged therefrom, the accumulated objects sliding down the air cushion by force of gravity and back onto the conveyor when there is space for the objects on the conveyor.
7. The accumulator as recited in claim 6 wherein the plate is inclined at an angle of between 1 to 3 degrees from the horizontal.
8. A method of accumulating articles conveyed along a conveyor comprising,
    providing a plate with holes adjacent a conveyor which plate is inclined downwardly toward the conveyor,
    delivering pressurized fluid below said plate to produce upwardly directed fluid streams through the holes in the plate,
    feeding generally cylindrical-shaped objects onto the upstream end of the conveyor,
    squeezing said objects off the conveyor and onto the upwardly directed fluid streams when the objects are fed onto the conveyor at a faster rate than they are removed therefrom, and
    sliding the objects by gravity on the fluid streams along the plate back onto the conveyor when space becomes available on the conveyor.

References Cited

UNITED STATES PATENTS 3,233,501  12/1965  Fredley _____ 214—1

RICHARD E. AEGERTER, *Primary Examiner.*